(12) United States Patent
Gilad et al.

(10) Patent No.: US 11,736,662 B1
(45) Date of Patent: Aug. 22, 2023

(54) SYSTEMS AND METHODS FOR PRECISION DOWNSTREAM SYNCHRONIZATION OF CONTENT

(71) Applicants: Oran Gilad, Herzliya Pituach (IL); Samuel Chenillo, New York, NY (US); Oren Steinfeld, Tel Aviv (IL)

(72) Inventors: Oran Gilad, Herzliya Pituach (IL); Samuel Chenillo, New York, NY (US); Oren Steinfeld, Tel Aviv (IL)

(*) Notice: Subject to any disclaimer, the term of this patent is extended or adjusted under 35 U.S.C. 154(b) by 0 days.

(21) Appl. No.: 17/948,754

(22) Filed: Sep. 20, 2022

Related U.S. Application Data

(63) Continuation-in-part of application No. 17/670,480, filed on Feb. 13, 2022, now Pat. No. 11,483,496.

(60) Provisional application No. 63/328,067, filed on Apr. 6, 2022.

(51) Int. Cl.
| | |
|---|---|
| *H04N 7/167* | (2011.01) |
| *H04N 21/4408* | (2011.01) |
| *G06F 9/451* | (2018.01) |
| *H04N 21/4405* | (2011.01) |

(52) U.S. Cl.
CPC .............. *H04N 7/167* (2013.01); *G06F 9/451* (2018.02); *H04N 21/4405* (2013.01); *H04N 21/4408* (2013.01)

(58) Field of Classification Search
CPC ................................ H04N 7/167; G06F 9/451
See application file for complete search history.

(56) References Cited

U.S. PATENT DOCUMENTS

| | | | |
|---|---|---|---|
| 5,543,856 A | 8/1996 | Rosser et al. | |
| 9,514,381 B1 | 12/2016 | Ludwigsen | |
| 11,004,456 B2 | 5/2021 | Harkness et al. | |
| 2007/0266170 A1* | 11/2007 | Mockett | H04N 21/6405 709/231 |
| 2018/0097573 A1* | 4/2018 | Guo | H04N 21/4305 |

* cited by examiner

*Primary Examiner* — Shivang I Patel
(74) *Attorney, Agent, or Firm* — RosserIP, LLC; Roy Rosser

(57) ABSTRACT

Systems and methods for precision downstream synchronization of digital streaming content on an edge content processor in the absence of access to pixel-level data by a video player app operative on the edge content processor are disclosed. Encrypted video streams are synchronized to unencrypted video streams using acquired knowledge of the edge content processor's latency, i.e., the time elapsed between a command to render a video frame and that frame being displayed by the edge content processor. Once a predicted time of display of an encrypted video is obtained by a video player app operative on the edge content processor, a corresponding RGBA video frame is delayed by an amount of time equal to that predicted time minus the edge content processor's latency before a command to render it is issued by the video player app, thereby ensuring both frames are displayed simultaneously.

11 Claims, 3 Drawing Sheets

SYSTEMS AND METHODS FOR PRECISION DOWNSTREAM SYNCHRONIZATION OF CONTENT

CROSS-REFERENCE TO RELATED APPLICATIONS

This is a US continuation-in-part application of U.S. patent application Ser. No. 17/670,480 entitled "System and Method for Synchronizing Auxiliary Content to a Video Stream" that was filed on Feb. 13, 2022, and also claims priority to U.S. provisional patent application 63/328,067 entitled "Systems and Methods for Precision Downstream Synchronization of Content" that was filed on Apr. 6, 2022, the contents of both of which are hereby incorporated by reference in their entirety.

BACKGROUND OF THE INVENTION

(1) Field of the Invention

This invention relates to systems and methods for precision downstream synchronization of digital content, and more particularly to systems and methods for frame accurate synchronization of encrypted digital content streams to unencrypted video streams at the edge of a distribution network.

(2) Description of Related Art

In the fields of broadcast and streaming communications, commercial considerations may make it desirable to link auxiliary content to a broadcast stream of video with a high degree of accuracy at a location downstream of where the stream of video originated, i.e., at the edge of the distribution network. For instance, in the field of virtual advertising, images may be inserted into video streams so as to make them appear as if they were in the original scene. While the promotional image may be inserted at the origination point of the broadcast, it may be desirable to have targeted advertising in which the promotional image may be inserted downstream of the broadcast, preferably by an end user's viewing device. In this way, the inserted image may be selected to suit the individual user. This may, for instance, be accomplished by sending data used for used for making the virtual insertion, such as, but not limited to, the keying, occlusion and tracking data, to the end user device and have the virtual content inserted by that device. This may, for instance, be accomplished using video with an alpha channel, known as RGBA video that may be rendered together with the main video stream. The alpha channel may, for instance, be used to control the degree of transparency of individual pixels of a video frame. A problem may arise if the main video stream is encrypted, and the synchronization of the channels is required to be frame accurate. In such a circumstance, apps operable on the web browser may not have access to the pixel values of the main streaming video in time to use pixel-based synchronization techniques.

What is needed are systems and methods that allow frame accurate downstream synchronization of streaming content that does not rely on access to image data at the pixel level.

The relevant prior art includes:

U.S. Pat. No. 5,543,856 issued to Rosser et al. on Aug. 6, 1996 entitled "System and method for downstream application and control electronic billboard system" that describes a system and method for authorizing, controlling, and monitoring the insertion of advertising indicia and other video images into a broadcast video stream by an Electronic Billboard system operated at a location remote from a video program origination location. The disclosed control means will be implemented in the form of a user key which is presupplied to an operator of the remote Electronic Billboard system, a broadcast key supplied to that operator at or near the time of transmission of the broadcast video stream, and a verification means operated in conjunction with the remote Electronic Billboard system to verify that those keys correspond to a predetermined criteria. Upon such verification, the remote Electronic Billboard system is enabled to operate on the broadcast video stream. The control means may also be applied for maintaining the integrity of either or both the products being advertised and the event being broadcast.

U.S. Pat. No. 11,004,456 issued to Harkness et al. on May 11, 2021, entitled "Methods, apparatus and articles of manufacture to provide secondary content in association with primary broadcast media content" that describes methods, apparatus, and articles of manufacture to provide media content are disclosed. Example apparatus disclosed herein include means for identifying primary media content presented on a first media presentation device. Disclosed example apparatus also include means for accessing a secondary content schedule associated with the primary media content. The secondary content schedule includes a plurality of secondary content items and time values associated with the secondary content items. The secondary content items are also associated with a loyalty value for a user of the first media presentation device. Disclosed example apparatus further include means for selecting one of the secondary content items to be accessed in response to a timestamp associated with the primary media content being between time values associated with the selected one of the secondary content items in the secondary content schedule.

U.S. Pat. No. 9,514,381 issued to Ludwigsen et al. on Dec. 6, 2016 entitled "Method of identifying and replacing an object or area in a digital image with another object or area" that describes a system and method for object and area detection and replacement in an image includes identifying an object or area in one or more sequential images that form a moving image sequence and replacing some or all of the identified object or areas with another image such that the image looks to be part of the original composition of the original image including lighting, shadows, placement, occlusion, orientation, position, and deformation.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

Inventive systems and methods for precision downstream synchronization of digital streaming content in the absence of access to pixel-level data are disclosed.

In one preferred embodiment an edge content processor may receive two streams of content. The first may, for instance, be an encrypted digital stream that may contain the main content. This may take the form of an unencrypted header file and one or more encrypted video frames. The header file may include a first set of time codes. The second content stream may, for instance, be an unencrypted, auxiliary content stream. This unencrypted auxiliary stream may include a second header file and one or more RGBA video frames having alpha frames. The second header file may include a second set of time codes. The second set of time codes may, for instance, be indicative of which of the auxiliary content RGBA frames are intended to be displayed simultaneously with particular video frames of the encrypted video frames. This linkage between the content and auxiliary video frames may have been determined upstream and prior to the encryption of the main content. The auxiliary content RGBA video frames may, for instance, be overlay content required to be placed precisely both in location and time in order, for instance, to act as a seamless virtual insertion.

To affect this precise placement without access to the pixel level data of the encrypted video, the system may first measure a latency of the edge content processor, which may, for instance, be, but is not limited to, a web browser, a smart TV player, or a mobile native player. The latency of the edge content processor may be a time elapsed between a video player app operative on the edge content processor issuing a command to render one of the auxiliary content RGBA video frames and that frame being displayed on the browser. In applications in which the RGBA video frames are reasonably consistent in size and appearance, this latency may be assumed to be a constant for a given edge content processor.

Having measured the edge content processor latency, the video player app may then wait to receive a predicted time at which a particular one of the encrypted, main content video frames is to be displayed. This prediction may, for instance, be made by the rendering engine when presented with the frame to be rendered. The time to render the video frames of the main content may vary significantly as it may depend both on the content, i.e., on the detail of the image in the frame and on how similar the current frame is to a previous frame, as well as the hardware on the edge content processor. The rendering process may, for instance, be dependent on the type of graphics processor units (GPUs) available and the drivers, or software, available to implement it. The time taken to render one of the main content frames may, therefore, vary significantly from frame to frame. Moreover, the time to when the rendered and buffered video frames may actually be displayed may also vary significantly from frame to frame.

The video player app may be programmed to then calculate a delay time that may be equal to the difference between the predicted time of display of a particular encrypted frame and the edge content processor latency. The video player app may then wait for a time equal to this delay time before issuing a command to render the corresponding RGBA frame. In this way, the two frames may arrive at a display buffer at the same time and may be displayed simultaneously by the web browser.

In one embodiment of the present invention, the edge content processor latency may be measured using a test RGBA video frame. The video player app may, for instance, issue a command to render the test frame, and then begin obtaining screen shots of the edge content processor's display. These screen shots may be examined and the time at which the test shot first appears may be determined as the latency of the edge content processor.

Therefore, the present invention succeeds in conferring the following, and others not mentioned, desirable and useful benefits and objectives.

It is an object of the present invention to provide a simple but reliable method of synchronizing video data in the absence of access to pixel level data.

DETAILED DESCRIPTION OF THE INVENTION

Figure 1:
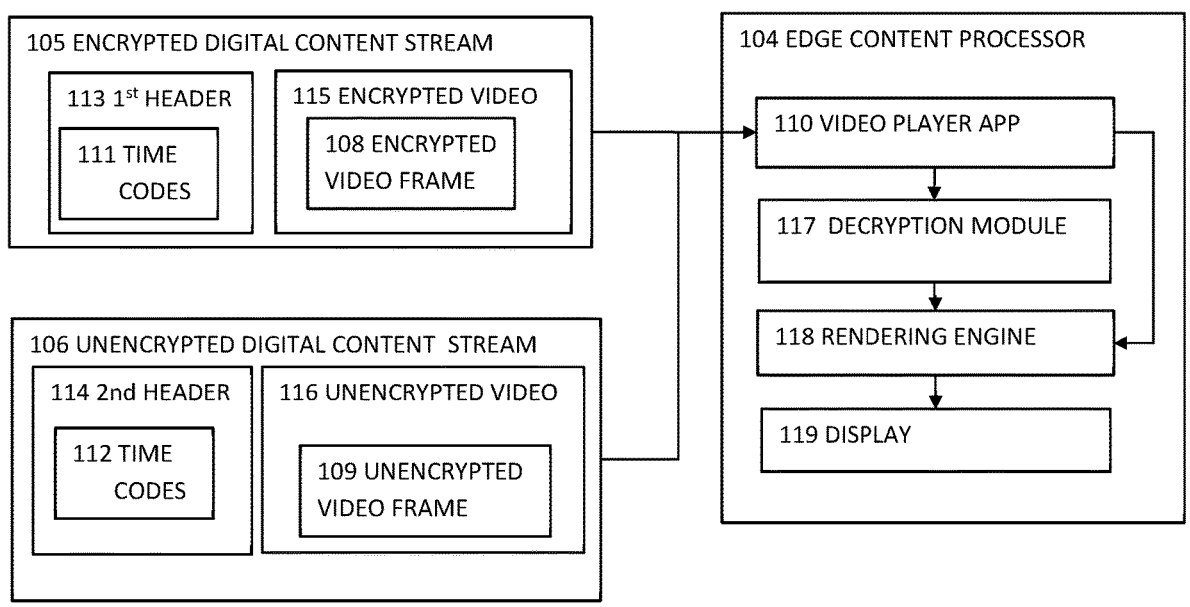
FIG. 1 shows a schematic representation of one embodiment of a system for frame accurate synchronization of an encrypted digital content stream to an auxiliary video stream.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation of one embodiment of a system for frame accurate synchronization of an encrypted digital content stream to an auxiliary video stream.

A video player app 110 may be operable on an edge content processor 104. The edge content processor 104 may, for instance, be, but is not limited to, a web browser, a smart TV player, or a mobile native player. The web browser may, for instance, be running on a digital information processing platform such as, but not limited to, a mobile phone or desktop computer. The video player app 110 may receive streaming content intended for display on a video display 119 associated with the edge content processor 104.

The video player app 110 may, for instance, receive two related streams of digital content. The first may be an encrypted digital content stream 105 and the second may be an unencrypted digital video stream 106. The first content stream may be the main, or principal, content intended for display, while the second content stream may be auxiliary content that may be intended to enhance the main content. Auxiliary content may be content such as, but not limited to, closed caption script, additional or alternate audio tracks, graphic overlays, or graphics for virtual insertions.

The encrypted digital content stream 105 may be delivered over a network such as, but not limited to, the Internet, in packets each of which may contain a few seconds of video content. Each of the packets may contain a first, unencrypted header file 113 and one or more encrypted video frames 108. The first, unencrypted header file 113 may contain time codes for the encrypted video frames 108. Encryption of the encrypted digital content stream 105 may, for instance, have been undertaken to prevent the content being pirated. The encryption may allow only end users having appropriate decryption software to view the content, thereby allowing producers of the content to determine which end users may view the content.

The unencrypted digital video stream 106 may also be delivered over a communications network in discrete packets each of which may contain a second header file 114 and one or more unencrypted video frames 109 that may, for instance, be RGBA video frames having an alpha channel. The second header file 114 may contain time codes 112 that may link the RGBA video frames to intended matching frames of the encrypted main video frames.

The RGBA video frames 109 having an alpha channel may be related to the encrypted video frames in that corresponding video frames may be intended to be shown simultaneously. For example, the RGBA video frames may contain auxiliary content such as, but not limited to, advertising images. These advertising images may, for instance, be customized for individual, or groups of, end users, and may be meant to be seamlessly overlayed with the main content. Different advertisers may wish to appeal to different audiences in the same event. A billboard in a stadium at which a game is being played may be used to give different messages to different end users by seamlessly inserting different images into the main content at the end users web browser. The correspondence between the encrypted video frames 108 and unencrypted video frames may, for instance, be established by corresponding time codes.

The encrypted video frames 108 may be part of an encrypted video 115 contained within an encrypted digital content stream 105. This encrypted digital content stream may also contain a first unencrypted header file 113 containing a first set of unencrypted time codes 111 associated with the encrypted video frames 108.

Similarly, the unencrypted video frames 109 may be part of an unencrypted video 116 contained within an unencrypted digital content stream 106. This unencrypted digital content stream 106 may also contain a second unencrypted header file 114 that may contain a second set of unencrypted time codes 112.

The two sets of time codes may be used to identify corresponding encrypted video frames 108 and unencrypted video frames which may be RGBA video frames having an alpha channel. The correspondence between the video frames may, for instance, have been established at an upstream location such as, but not limited to, at the production of the streaming content.

The video player app 110 on the edge content processor 104 may manage the receipt and handling of video content streams. The app 110 may be a software program written in a suitable language that may be interpreted by the edge content processor such as, but not limited to, JavaScript. The video player app 110 may comprise, or have access to, appropriate digital memory for buffering the content it receives.

The video player app 110 may, for instance, direct encrypted video frames 108 contained in the encrypted video 115 to a decryption module 117 for decryption. The decrypted frames may then be fed on to a rendering engine 118 that may prepare the frames for display on a display 119 that may be part of the web browser.

The video player app 110 may also direct the unencrypted video frames 109, that may be RGBA video frames having an alpha channel contained in the unencrypted video 116, directly to the rendering engine 118 for display on the display 119 associated with the edge content processor.

The video player app 110 may also be able to access both the first set of unencrypted time codes 111 and the second set of unencrypted time codes 112 and use them and other appropriate calculations to ensure that corresponding frame from the two content streams are displayed at the correct time with frame accurate synchronization.

For many applications, synchronizing the auxiliary content to the main content within two or three frames of video may be acceptable and may not be noticed by a viewer of the video. However, in virtual insertions where the intention is to make the inserted graphic appear to be a part of the original video content, misalignment by a single frame is discernable to even the average viewer. For quality virtual insertion, it is necessary to synchronize the main and auxiliary content to within a single frame. There are methods to do this when the video player app 110 has access to the pixels of the main video prior to rendering, as described in, for instance, U.S. patent application Ser. No. 17/670,480 entitled "System and Method for Synchronizing Auxiliary Content to a Video Stream" that was filed on Feb. 13, 2022, the contents of which are hereby incorporated by reference in their entirety.

However, when the main video is encrypted, the video player app 110 may not have access to the image pixels prior to rendering. This may be due to processing flow as illustrated in FIG. 1.

In other implementations, the edge content processor, or the video player app, may combine the decryption module with the rendering module, so that decryption and rendering occur within the same module, blocking any access to the content until after it is rendered. This may be true, for instance, of any edge content processor implementing Google's Widevine Digital Rights Management (DRM) level 1 protection, in which both cryptography and media processing operations occur in a trusted execution environment (TEE), i.e., rendering and decryption essentially occur together.

When, for whatever reason, the video player app may not have access to the content prior to the content reaching the display buffer, the synchronization method of the present invention may be needed to obtain the necessary precision of synchronization. This method is described in detail below.

Figure 2:
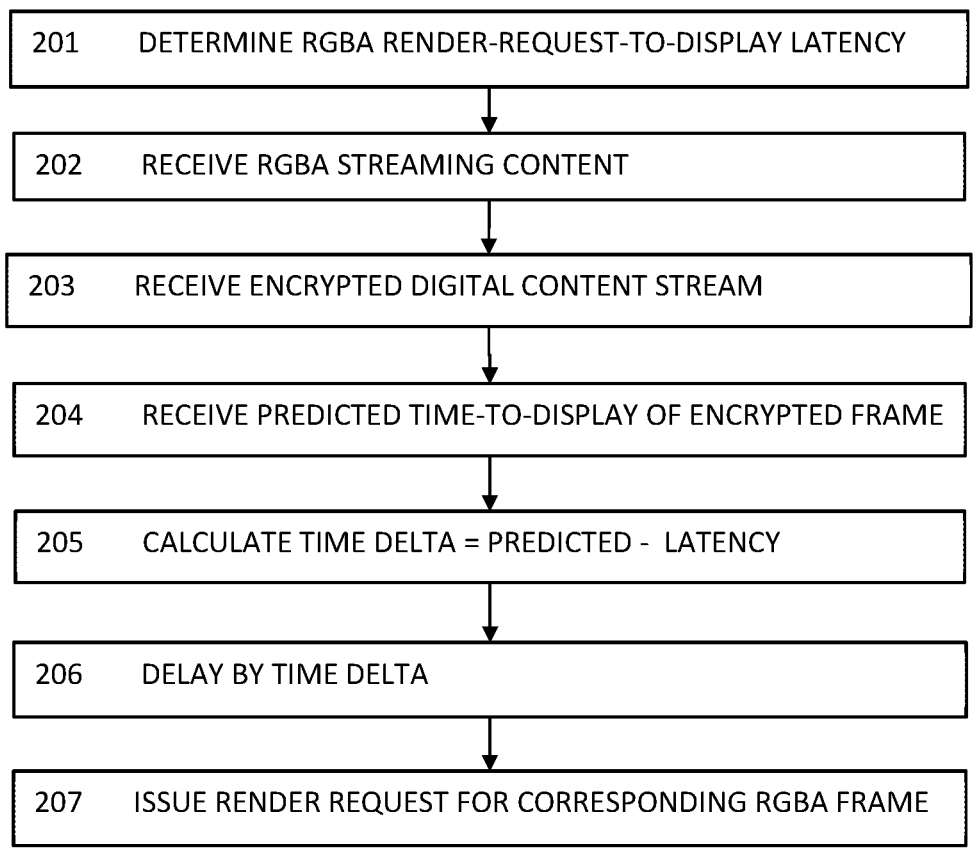
FIG. 2 is a flow diagram showing representative steps of one embodiment of a method for frame accurate synchronization of an encrypted digital content stream to an auxiliary video stream.

FIG. 2 is a flow diagram showing representative steps of one embodiment of a method for frame accurate synchronization of an encrypted digital content stream to an auxiliary video stream.

In Step 201 "DETERMINE RGBA RENDER-REQUEST-TO-DISPLAY LATENCY" a video player app operative on an edge content processor may determine a render-request-to-display latency of that particular edge content processor. This latency may, for instance, be a time elapsed between the video player app issuing a command to render a video frame and that video frame being displayed on a display associated with that edge content processor. The RGBA video frames having an alpha channel that typically constitute the auxiliary content are usually similar in appearance, size, and complexity. The latency in displaying them is, therefore, usually a constant, or sufficiently close to a constant for practical purposes. The latency of a particular edge content processor may, therefore, only need to be measured once, typically at the start of a video displaying session.

In Step 202 "RECEIVE RGBA STREAMING CONTENT" the video player app operative on the edge content processor may receive an unencrypted digital content stream in the form of packets of unencrypted RGBA video. This video may take the form of auxiliary graphics intended to be combined with main content video. To facilitate presentations that may be unique to individual viewers, the auxiliary graphics may only be mixed with the main content when they both arrive at the viewer's edge content processor. The video player app may deconstruct the content stream, extracting and appropriately buffering items such as, but not limited to, a set of unencrypted time codes that may be contained in a header file, and unencrypted video frames that may be contained in an unencrypted video. These video frames may be RGBA video frames having an alpha channel. The alpha channel may define regions of transparency in the frame and their degree of transparency. This control of transparency may be accomplished with pixel precision. This may, for instance, allow the frames to be displayed simultaneously with another frame, and only fully or partially obscure selected portions of that other channel.

In Step 203 "RECEIVE ENCRYPTED DIGITAL CONTENT STREAM" the same video player app operative on the edge content processor may receive an encrypted digital content stream that may be the main content. The main content may arrive in the form of packets of encrypted video. The encryption may have been done to, for instance, preserve digital content rights.

The video player app may deconstruct the content stream, extracting and appropriately buffering items such as, but not limited to, a set of unencrypted time codes that may be contained in a header file, and encrypted video frames that may be contained in an unencrypted video. The video player app may then send one or more of the encrypted video frames on to a decryption module for decryption, and then on to a rendering engine. The rendering engine may prepare the decrypted frame for display and send it to a display buffer. In some edge content processors, the decryption module and the rendering module may be combined, so that decryption and rendering take place within a single module.

In Step 204 "RECEIVE PREDICTED TIME-TO-DISPLAY OF ENCRYPTED FRAME", a video player app may receive a prediction of how long of a time interval may elapse before a particular video frame is displayed. Such a prediction may, for instance, be issued by a rendering module when the frame is presented for rendering. This prediction may, for instance, be made after the video frame has been decrypted.

In an HTTP live streaming environment, a video player app may, for instance, use a requestVideoFrameCallback( ) method. This method is a callback method that, once registered, may notify the video player app each time a new frame is presented to a compositor at the start of the rendering process. The callback may have metadata in the form of a VideoFrameMetadata dictionary. This dictionary that may include a presentationTime and an expectedDisplayTime. The presentationTime may represent a time at which frame was submitted for composition while the expectedDisplayTime may represent time at which the frame is expected to be visible on the edge content processor's display. These times may be expressed as elapsed times in milliseconds from some common time origin such as, but not limited to, the beginning of the current HTML document's life cycle. These methods may be implemented on edge content processor such as, but not limited to, the Google Chrome browser running a Blink rendering engine and a V8 JavaScript engine. The Google Chrome browser is distributed by Alphabet Inc. of Mountain View, Calif..

In Step 205 "CALCULATE TIME DELTA=PREDICTED−LATENCY" the video player app may calculate a time delta, or delay time, that may be equal to the difference between the predicted, or expected, time to display one of the encrypted frames and the render-request-to-display latency of the browser.

In Step 206 "DELAY BY TIME DELTA" the video player app may delay an unencrypted frame that corresponds to the next encrypted frame to be displayed. This delay may, for instance, be affected by buffering the frame in a suitable digital memory. The delay may be the time determined in Step 205, i.e., to the difference between the predicted, or expected time to display of one of the encrypted frames and the render-request-to-display latency of the edge content processor.

In Step 207 "ISSUE RENDER REQUEST FOR CORRESPONDING RGBA FRAME" the video player app may, after having waited by the time delta, or delay time, calculated in Step 205, may now issue a request to render the corresponding unencrypted video frame. Because of the delay in issuing the request to render the unencrypted video, the two corresponding video frames may now be rendered so as to arrive at a display buffer simultaneously, and therefore be displayed simultaneously. If the unencrypted video is an RGBA frame, the two frames may now be displayed with the RGBA frame superimposed on the correct, or corresponding, one of the previously encrypted video frames.

Figure 3:
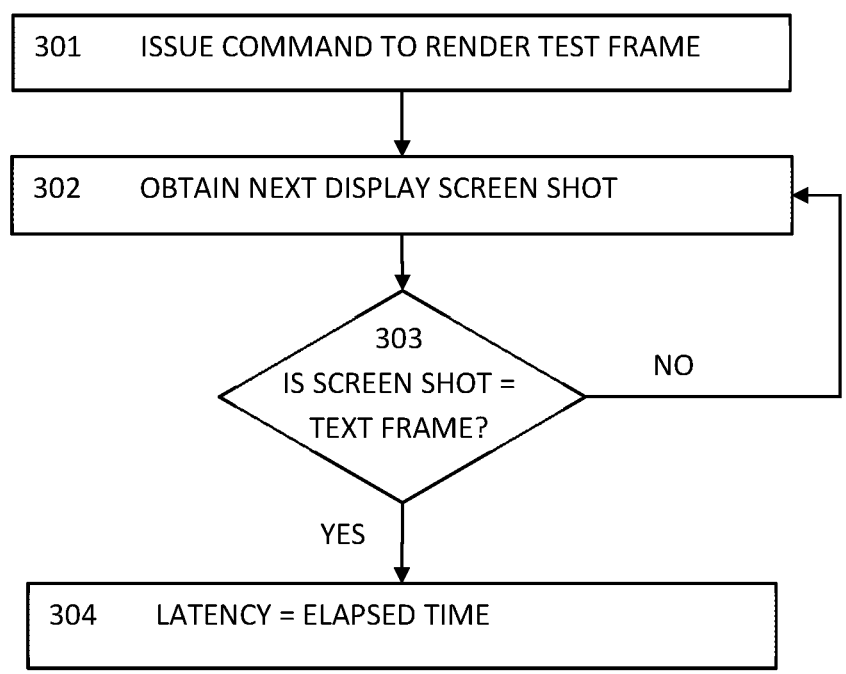
FIG. 3 shows is a flow diagram showing representative steps of one embodiment of a method of measuring a render-request-to-display latency of an edge content processor.

FIG. 3 shows is a flow diagram showing representative steps of one embodiment of a method of measuring a render-request-to-display latency of an edge content processor.

In Step 301 "ISSUE COMMAND TO RENDER TEST FRAME" the video player app operable on the edge content processor may issue a command to for the edge content processor 104's rendering engine to render a test video frame. The test video frame may be an easily identifiable RGBA frame of similar size and complexity to a typical auxiliary frame. The test frame may be easily identifiable because of an attribute such as, but not limited to, being of a single color, having a simple to identify pattern such as, but not limited to, a square, or a cross, or having an easily identifiable pattern of transparency.

In Step 302 "OBTAIN NEXT DISPLAY SCREEN SHOT" the video player app may obtain a screen shot of the video frame currently being displayed on the edge content processor display.

In Step 303 "IS SCREEN SHOT=TEXT FRAME?" the video player app may examine the screen shot it has just obtained and compare it to the test image. This examination may be accomplished by any of the well-known pattern recognition techniques such as, but not limited to, comparing pixel values. If the app determines that the current screen shot is not the test image, it may loop back to Step 302 and obtain a screen shot of the next video frame to be displayed by the edge content processor's display. If the app instead determines that the current screen shot is the test image, or is sufficiently similar to the test image, the app may then proceed to Step 304.

In Step 304 "LATENCY=ELAPSED TIME" having determined that the current screen shot is the test image, the app may then determine that the edge content processor's render-request-to-display latency is the time elapsed between issuing the command to render the test RGBA video frame and obtaining the matching screen shot of the test RGBA video frame.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method for frame accurate synchronization of an encrypted digital content stream to an unencrypted digital video stream, comprising:

receiving, by an edge content processor, said encrypted digital content stream comprising one or more encrypted video frames and said unencrypted digital video stream comprising one or more RGBA video frames having an alpha channel;

measuring, by a video player app operative on said edge content processor, a network independent latency of said edge content processor in processing one of said RGBA video frames for display;

calculating, by said video player app, a delay time equal to the difference between a predicted time of when one of said encrypted frames will be displayed by said edge content processor and said latency; and, issuing by said video player app, after said delay time, a command to display a corresponding one of said RGBA video frames, thereby causing said edge content processor to display said frames simultaneously and superimposed.

2. The method of claim 1, wherein, said latency of said edge content processor is a time elapsed between issuing a command to render one of said RGBA video frames and said RGBA video frame being displayed by said edge content processor.

3. The method of claim 2, wherein, measuring said latency of said edge content processor comprises:
issuing a command to render a test RGBA video frame;
obtaining a screen shot of a currently displayed video frame;
comparing said screen shot to said test RGBA video frame; and
when said screen shot matches said test RGBA video frame, determining said latency as the time elapsed between issuing said command to render said test RGBA video frame and obtaining said matching screen shot of said test RGBA video frame.

4. The method of claim 3, wherein, said test RGBA video frame is comprised of a single uniform color.

5. The method of claim 1, wherein, said one or more encrypted video frames are associated with a first set of unencrypted time codes, and said one or more RGBA video frames are associated with a second set of unencrypted time codes thereby associating a particular encrypted video frame with a corresponding RGBA video frame having a matching time code.

6. The method of claim 5, wherein, said first set of encrypted time codes are contained in a first unencrypted header file associated with said one or more encrypted video frames, and said second set of unencrypted time codes are contained in a second unencrypted header file associated with said one of more RGBA video frames.

7. The method of claim 1 wherein said time prediction of when one of said encrypted frames will be displayed is obtained using an expectedDisplayTime function of a requestVideoFrameCallback( ) method.

8. A system for frame accurate synchronization of an encrypted digital content stream to an unencrypted digital video stream, comprising:
an edge content processor;
a video player app operative on said edge content processor;
said encrypted digital content stream comprising one or more encrypted video frames and said unencrypted digital video stream comprising one or more RGBA video frames having an alpha channel;
a network independent latency of said edge content processor in processing one of said RGBA video frames for display, as measured by said video player app;
a delay time, calculated by said video player app, equal to the difference between a time prediction of when one of said encrypted frames will be displayed and said latency; and,
a simultaneous display by said edge content processor of one of said encrypted frames and a corresponding one of said RGBA video frames, said simultaneous display being affected by a command to display said corresponding RGBA video frames being issued delayed by said delay time after a command to display said one of said encrypted frames.

9. The system of claim 8, wherein, said latency of said edge content processor is a time elapsed between issuing a command to render one of said RGBA video frames and said RGBA video frame being displayed by said video player.

10. The system of claim 9, wherein, said latency of said edge content processor is measured by said video player app by a method comprising:
issuing a command to render a test RGBA video frame;
obtaining a screen shot of a currently displayed video frame;
comparing said screen shot to said test RGBA video frame; and
when said screen shot matches said test RGBA video frame, determining said latency as the time elapsed between issuing said command to render said test RGBA video frame and obtaining said matching screen shot of said test RGBA video frame.

11. The system of claim 10, wherein, said test RGBA video frame is comprised of a single uniform color.

* * * * *